United States Patent [19]
Furusawa

[11] Patent Number: 5,490,277
[45] Date of Patent: Feb. 6, 1996

[54] DIGITAL COMPUTATION INTEGRATED CIRCUIT

[75] Inventor: Toshiyuki Furusawa, Tokyo, Japan

[73] Assignee: Kabushiki Kaisha Toshiba, Kawasaki, Japan

[21] Appl. No.: 994,430

[22] Filed: Dec. 23, 1992

[30] Foreign Application Priority Data

Dec. 25, 1991 [JP] Japan .................. 3-343294

[51] Int. Cl.$^6$ ................................... G06F 9/26
[52] U.S. Cl. .................. 395/775; 395/375; 364/DIG. 1; 364/232.8; 364/247.6; 364/251; 364/261.3; 364/262; 364/262.4; 364/263
[58] Field of Search ................................... 395/775, 375

[56] References Cited

U.S. PATENT DOCUMENTS

| | | | |
|---|---|---|---|
| 3,764,988 | 10/1973 | Onishi | 395/375 |
| 3,793,631 | 2/1974 | Silverstein et al. | 395/375 |
| 4,287,559 | 9/1981 | Easley et al. | 395/375 |
| 4,292,667 | 9/1981 | Catiller et al. | 395/275 |
| 4,298,927 | 11/1981 | Berglund et al. | 395/375 |
| 4,310,880 | 1/1982 | Gehman | 395/775 |
| 4,443,848 | 4/1984 | Gehman | 395/550 |
| 4,471,433 | 9/1984 | Matsumoto et al. | 395/375 |
| 4,656,613 | 4/1987 | Norwood et al. | 365/208 |
| 4,689,765 | 8/1987 | Hooper | 395/775 |
| 4,713,749 | 12/1987 | Magar et al. | 395/375 |
| 4,750,112 | 6/1988 | Jones et al. | 395/375 |
| 4,760,519 | 7/1988 | Papworth et al. | 395/375 |
| 4,777,594 | 10/1988 | Jones et al. | 395/375 |
| 4,807,115 | 2/1989 | Torng | 395/375 |
| 5,263,153 | 11/1993 | Intrater et al. | 395/575 |

*Primary Examiner*—Jack B. Harvey
*Assistant Examiner*—Ayaz R. Sheikh
*Attorney, Agent, or Firm*—Foley & Lardner

[57] ABSTRACT

A digital computation integrated circuit has instruction memory for storing an instruction data, a store address designating part for designating a storing address of the instruction data in the instruction memory and for outputting the instruction data; an instruction decoder for receiving the instruction data outputted from the instruction memory and for converting the instruction data into a control signal to be outputted; an address determining part for determining an address necessary to reproduce history of a program when decoding result by the instruction decoder is found that the instruction data represent nonsequential progress of a program; and an address memory for storing the address necessary to reproduce history of a program in a storing address thereof designated by the storing address determining part.

14 Claims, 6 Drawing Sheets

DIGITAL COMPUTATION INTEGRATED CIRCUIT

BACKGROUND OF THE INVENTION

1. Field of the Invention

The present invention relates to a digital computation integrated circuit and, more particularly, to a digital computation integrated circuit including a circuit preferably applicable to developing an instruction program.

2. Description of the Prior Art

A known conventional digital computation integrated circuit outputs a control signal in accordance with the instruction program stored in an instruction memory.

Such a conventional digital computation integrated circuit is constructed to sequentially execute instruction data stored in an instruction memory in the order of addresses. Furthermore, this digital computation integrated circuit is so constructed as to allow an instruction (hereinafter called a [branch instruction]) to designate an address of instruction data to be executed next and an instruction (hereinafter referred to as a [repetitive instruction]) to repeatedly execute the same instruction for a predetermined number of times.

A description of such a digital computation integrated circuit will hereafter be given by exemplifying a digital computation integrated circuit that allows the branch instruction.

Referring to FIG. 6, when switching ON a power supply, a control signal 110 is set at a low level. Consequently, a program address selector 103 directly outputs a value inputted from an adder 102. Further, an output value from this program address selector 103 is inputted directly to an address counter register 104. The value inputted thereto is outputted to an instruction memory 105 in synchronization with a next system clock $\phi$.

An instruction program is stored in the instruction memory 105. Outputted is instruction data stored in the same address as the value inputted from the address counter register 104. For instance, if the input value from the address counter register 104 is [001], the instruction memory 105 outputs the instruction data stored in an address [001].

The instruction data outputted from the instruction memory 105 is temporarily stored in an instruction register 106. The instruction data is then inputted to an instruction decoder 107 in synchronization with the next system clock $\phi$.

This instruction decoder 107 decodes the instruction data inputted. If the instruction data does not represent a branch instruction, this instruction data is converted into a control signal and outputted. At this moment, the instruction decoder 107 holds the selection signal 110 as it remains at the low level. Hence, the program address selector 103 directly outputs the input value from the adder 102, consecutively. Hereupon, the adder 102 adds [1] to the value inputted from the address counter register 104 and then outputs the added value. The address of the instruction data outputted from the instruction memory 105 therefore turns out a next address of the instruction data outputted last time. For example, if the address of the instruction data outputted last time is an address [001], instruction data in an address [002] is to be outputted this time.

On the other hand, when the decoded instruction data represents a branch instruction, the instruction decoder 107 alters the selection signal 110 to a high level. Simultaneously, this instruction data is transferred as a branch instruction signal 111 to a branch address generating circuit 101. The branch address generating circuit 101 generates an address signal indicating a branching address from this branch instruction signal 111 and outputs it to the program address selector 103. At this moment, the program address selector 103, because of the selection signal 110 assuming the high level, outputs the address inputted from this branch address generating circuit to the address counter register 104. The instruction data stored in the branching address is thereby outputted from the instruction memory 105.

Control by a control unit (not shown) can be conducted in accordance with the instruction program stored in this instruction memory 105.

The address of each instruction data executed in this manner is stored as a piece of data in an address memory 108.

Connected to this address memory 108 is an address generator 109 for sequentially generating addresses starting from a predetermined address (e.g., an address [000]). The address generator 109 is constructed of: a latch 109a for sequentially outputting an address signal for designating a memory address of the address memory 108 in accordance with the system clock $\phi$; and an adder 109b for adding [1] to an output of this latch 109a after fetching this output and transmitting the added value back to the latch 109a.

The address memory 108 sequentially stores the output values of the address counter register 104 in the addresses designated by this address generator 109. For instance, if the addresses outputted from the address counter register 104 are [000], [001] and [005] (i.e., [001] is the branch instruction), the address data [000] is stored in the address [000] of the address memory 108. The address data [001] is stored in the address 001, and [005] is stored in the address [002], respectively.

Users can confirm whether or not the instruction program stored in the instruction memory 105 is executed according to a user's intentions on the basis of stored contents of this address memory 108. Namely, the instruction program can be thereby easily debugged.

A processing speed of the digital computation integrated circuit is enhanced with an increasingly sophisticated technology of the integrated circuit in recent years. With this enhancement, the instruction program becomes more and more complex.

Under such circumstances, the above-mentioned conventional digital computation integrated circuit requires the address memory 105 having a remarkably large storage capacity. This results in an increase in costs.

Exemplifying a digital computation integrated circuit for executing the instruction program consisting of a series of instruction data repeatedly at 8 kHz, each execution time is 125 μsec. Hence, the time needed for executing 1-step instruction data is 100 nsec. On this assumption, it is possible to execute the instruction program up to 1250 steps each time. Therefore, the address memory 105 may have a capacity enough to store 1250 pieces of address data.

In contrast, when the processing speed is enhanced, the time required for executing the 1-step instruction data is 50 nsec. In this case, it is feasible to execute the instruction program up to 2500 steps each time. The address memory 105 capable of storing 2500 pieces of address data is therefore required.

Moreover, a further amount of memory capacity is required when a processing is executed by a collective unit as performed in frame processing. For example, if there are 160 sampling data at 8 kHz, the total number of sampling data to be prosecuted within 125 μsec is 2500×160, so that considerable memory capacity will be necessary.

As described above, the conventional digital computation integrated circuit needs the address memory 105 having a capacity capable of storing at least the same number of address data as the number of steps of the instruction data to be processed. For this reason, there exists a necessity for increasing the storage capacity of the address memory 105 with a greater number of steps that can be processed in one execution.

SUMMARY OF THE INVENTION

Accordingly, it is a primary object of the present invention to provide a digital computation integrated circuit capable of reducing a storage capacity of an address memory.

According to the present invention, there is provided a digital computation integrated circuit comprising:

instruction memory means for storing instruction data;

store address designating means for designating a storing address of the instruction data in the instruction memory and for outputting the instruction data;

instruction decode means for receiving the instruction data outputted from said instruction memory means and for converting the instruction data into a control signal to be outputted;

address determining means for determining an address necessary to reproduce history of a program when decoding result by the instruction decode means is found that the instruction data represent non-sequential progress of a program; and address memory means for storing said address necessary to reproduce history of a program in a storing address thereof designated by said storing address determining means.

The cases where programs progress in a non-sequential manner are for example branch instruction and repetition instruction.

Accordingly, if the decoded instruction data represents the branch instruction store address of this instruction and branch destination address are selected by the address selection means, and also stored in address memory.

Also, if the decoded instruction data represents the repetition instruction, the number of repetition is counted by a counter and this count value and store address of this instruction are stored in address memory.

BRIEF DESCRIPTION OF THE DRAWINGS

Other objects and advantages of the present invention will become apparent during the following discussion in conjunction with the accompanying drawings, in which:

FIG. 8 is an electric circuit diagram showing one example of a conventional digital computation integrated circuit.

DESCRIPTION OF THE PREFERRED EMBODIMENTS (Embodiment 1)

Figure 1:
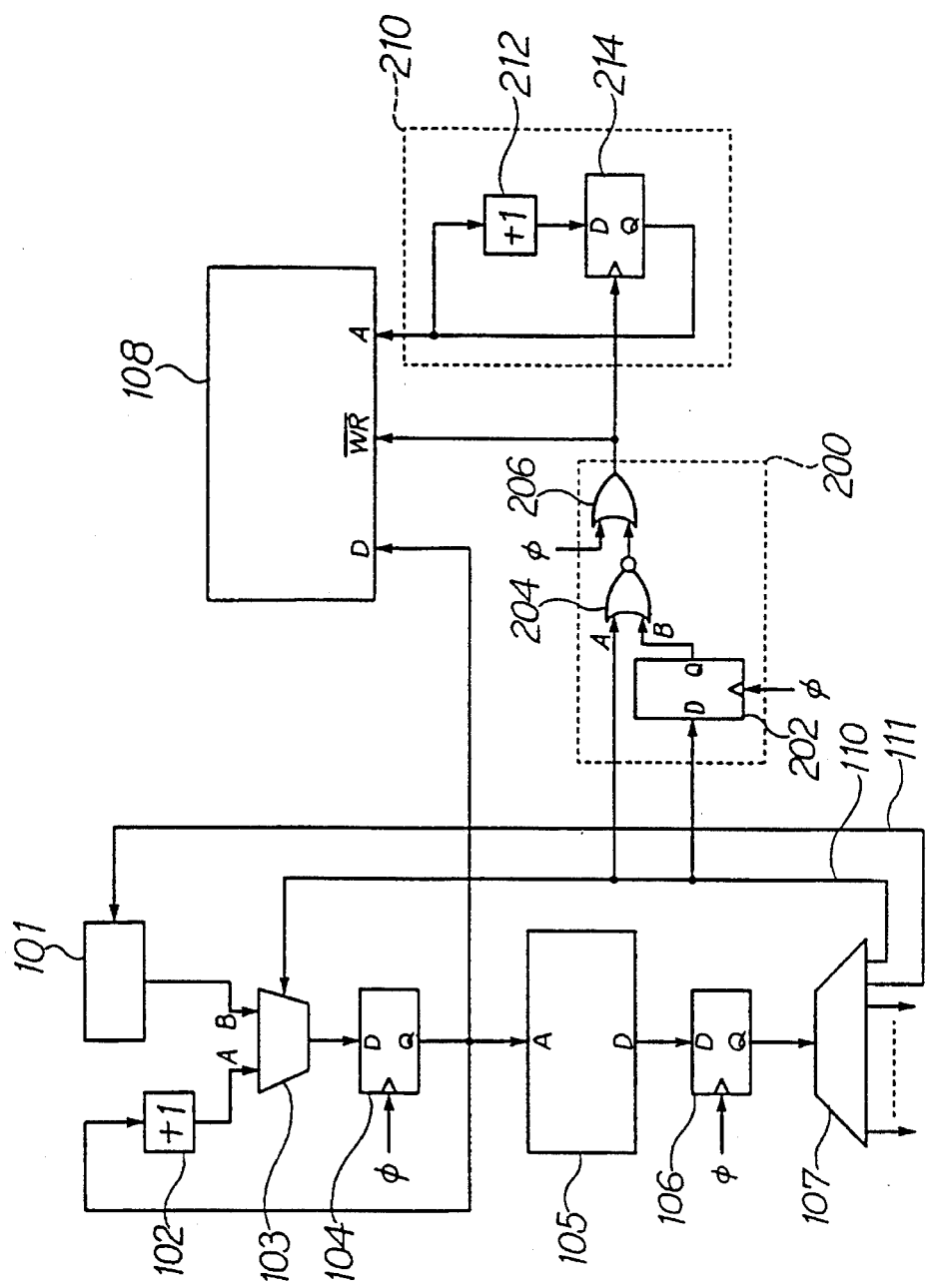
FIG. 1 is an electric circuit diagram illustrating a digital computation integrated circuit in accordance with one embodiment of the present invention.
Figure 6:
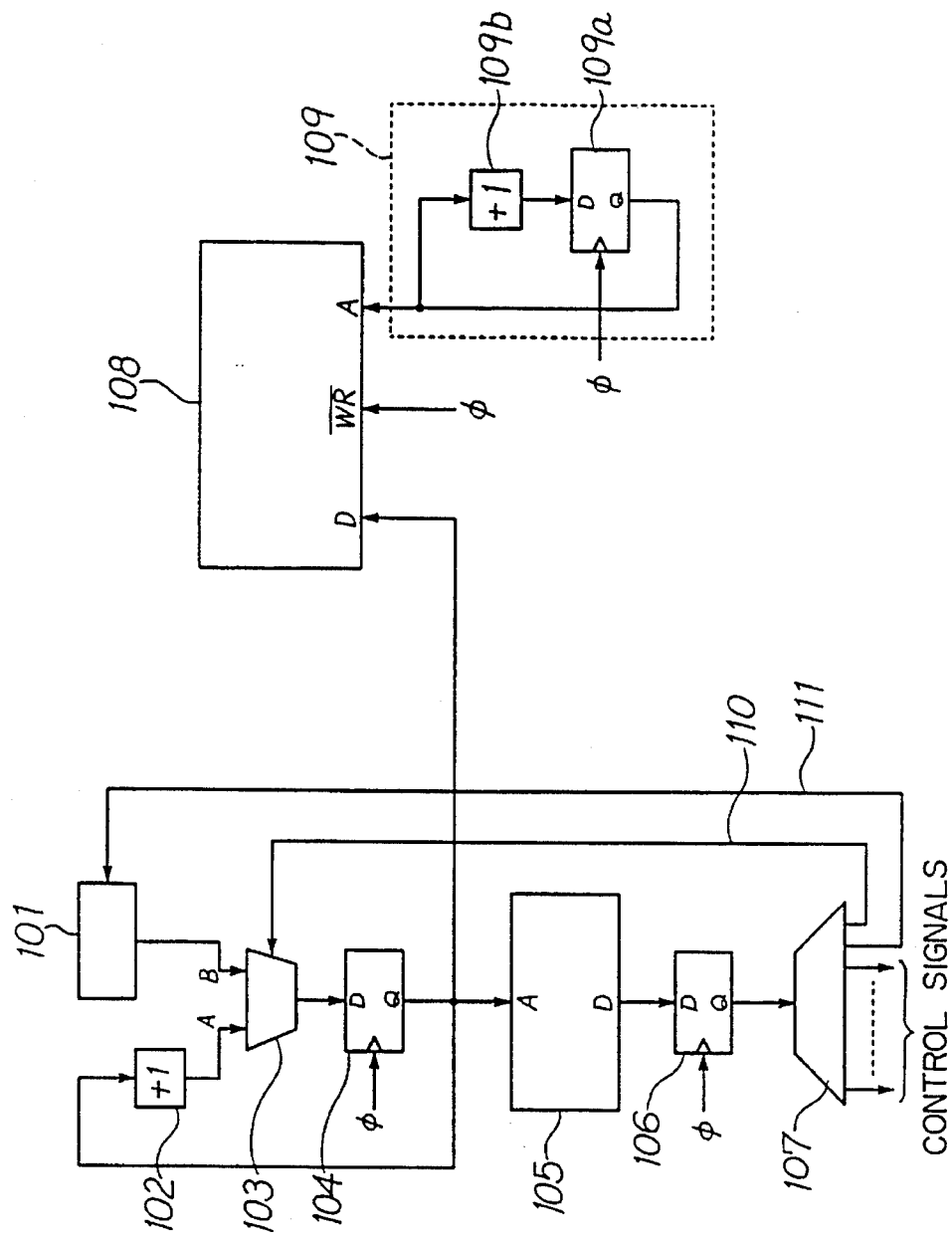

One embodiment of the present invention will hereinafter be described with reference to the accompanying drawings. In FIG. 1, since the structure and functions of elements from the branch address generating circuit 101 to the instruction decoder 107 are the same as the conventional structure and functions disclosed in FIG. 6, their detailed explanation will be omitted.

Turning to FIG. 1, a program address selector 103 is constructed to select an input A (i.e., output value of an adder 102) when a selection signal 110 is set at a low level and an input B (viz., output value of a branch address generating circuit 101) when set at a high level.

Herein, when resetting (or initializing) the digital computation integrated circuit, a selection signal 110 is set at a low level. The program address selector 103 therefore selects an input value [001] from an adder 102. This value is inputted via an address counter register 104 to an instruction memory 105. The instruction memory 105 outputs instruction data stored in an address [001].

An address of the instruction data representing a branch instruction and a branching address are stored in an address memory 108 through an address selecting circuit 200 and an address generating circuit 210.

Further, the address generator 210 comprises: a latch 214 for sequentially outputting an address signal for designating a memory address of the address memory 108 in accordance with a system clock ø; and an adder 212 for adding [1] to an output of this latch 214 after fetching this output and transmitting the added value back to the latch 214. Based on this construction, the address generator 210 is capable of sequentially generating addresses starting from an address [000].

When the selection signal 110 assumes a low level, inputs A, B of a NOR circuit 204 are both at the low level, and hence an output thereof invariably assumes a high level. An output of an OR circuit 206 is therefore fixed always at the high level. Accordingly, since the address memory 108 and the latch 214 are not active, no recording is effected in the address memory 108. Besides, an output value (address for writing to the address memory 108) of the address generator 210 is not changed.

In contrast with this, when the selection signal 110 varies from the low level to the high level, the input A of the NOR circuit 204 assumes the high level, while the output becomes the low level. Hence, the output of the OR circuit 206 changes in accordance with the system clock ø. The same signal as the system clock ø is thereby inputted to a write signal input terminal WR of the address memory 108 and to a clock input terminal CR of the latch 214. Stored in the address memory 108 in this way is an address of the instruction data indicating a branch instruction that is defined as an output value of the address counter selector 104 at this moment.

Next, when the level of the selection signal 110 changes from high to low, the input A of the NOR circuit 204 assumes the low level. An output level of the latch 202, however, changes from low to high, and the output is therefore kept at the low level. Accordingly, an output of the OR circuit 206 varies this time also in accordance with the system clock ø. The address memory 108 is thus capable of storing a branching address, i.e., the output value of the address counter selector 204 at this moment. Note that the output value of the address generator 210 is incremented by [1] at this time, and hence record data indicating the branching address is stored in a next address of the record data showing an address of the instruction data that represents a branch instruction.

Subsequently, the output level of the latch 202 changes from high to low in accordance with the next system clock ø. An output of the NOR circuit 204 is thereby fixed at the high level. Therefore, the output of the OR circuit 206 is also fixed at the high level. Consequently, the actions of the address memory 108 and of the latch 214 balt.

As discussed above, according to the digital computation integrated circuit in this embodiment, the address memory 108 is constructed to store only the address of the instruction data indicating the branch instruction and the branching address. It is possible to employ the address memory 108 having a still smaller storage capacity than in the conventional digital computation integrated circuit.

It is to be noted that the effects given above are remarkable especially in the digital computation integrated circuit which adopts a pipeline structure by way of an architecture as shown in this embodiment.

The pipeline structure involves the steps of simultaneously performing both an operation to decode the instruction data by a data processing circuit 107 and an operation to read the instruction data of the next address from the instruction memory 105 in parallel and thereby enhancing the processing speed.

In the digital computation integrated circuit employing the pipeline structure herein, if the instruction data decoded by the data processing circuit 107 is a branch instruction, the instruction data to be executed next is not read. For this reason, the processing speed is increasingly lowered as the instruction program contains a larger number of branch instructions. It is a common practice that the branch instruction is not used to the greatest possible degree.

Therefore, where this embodiment is applied to the digital computation integrated circuit described above, a frequency at which recording in the instruction memory 105 is conducted becomes very small so that particularly remarkable effects can be obtained.

Incidentally, the respective constructive parts shown in FIG. 1 are not necessarily formed on one chip on the whole.

Figure 2:
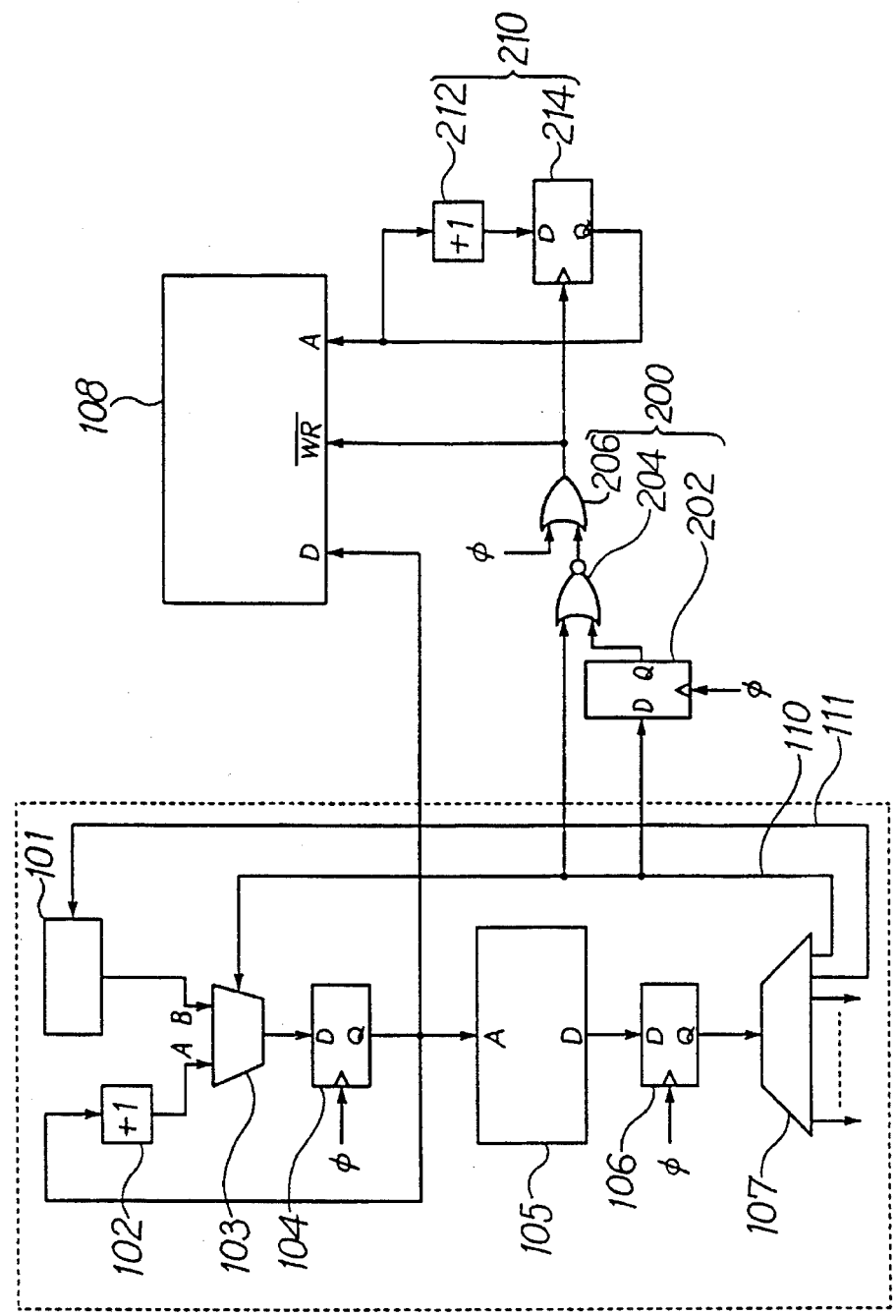
FIG. 2 is an electric circuit diagram showing one example of a partition between a portion formed of one chip and a portion formed independently in the digital computation integrated circuit shown in FIG. 1.

For instance, as illustrated in FIG. 2, the address memory 108, the address selecting circuit 200 and the address generator 210 may be constructed in the form of separately independent electric circuits. Other parts may adopt one-chip construction. In FIG. 2, a broken line denotes a boundary of the same integrated circuit.

The reason why such integration boundary is employed is that the address memory 108, the address selecting circuit 200 and the address generator 210 are used only when developed but are not employed after the mass-production thereof. Hence, if the only parts other than these circuits are mass-produced based on the one chip integration, the unit price of the element can be reduced.

Figure 3:
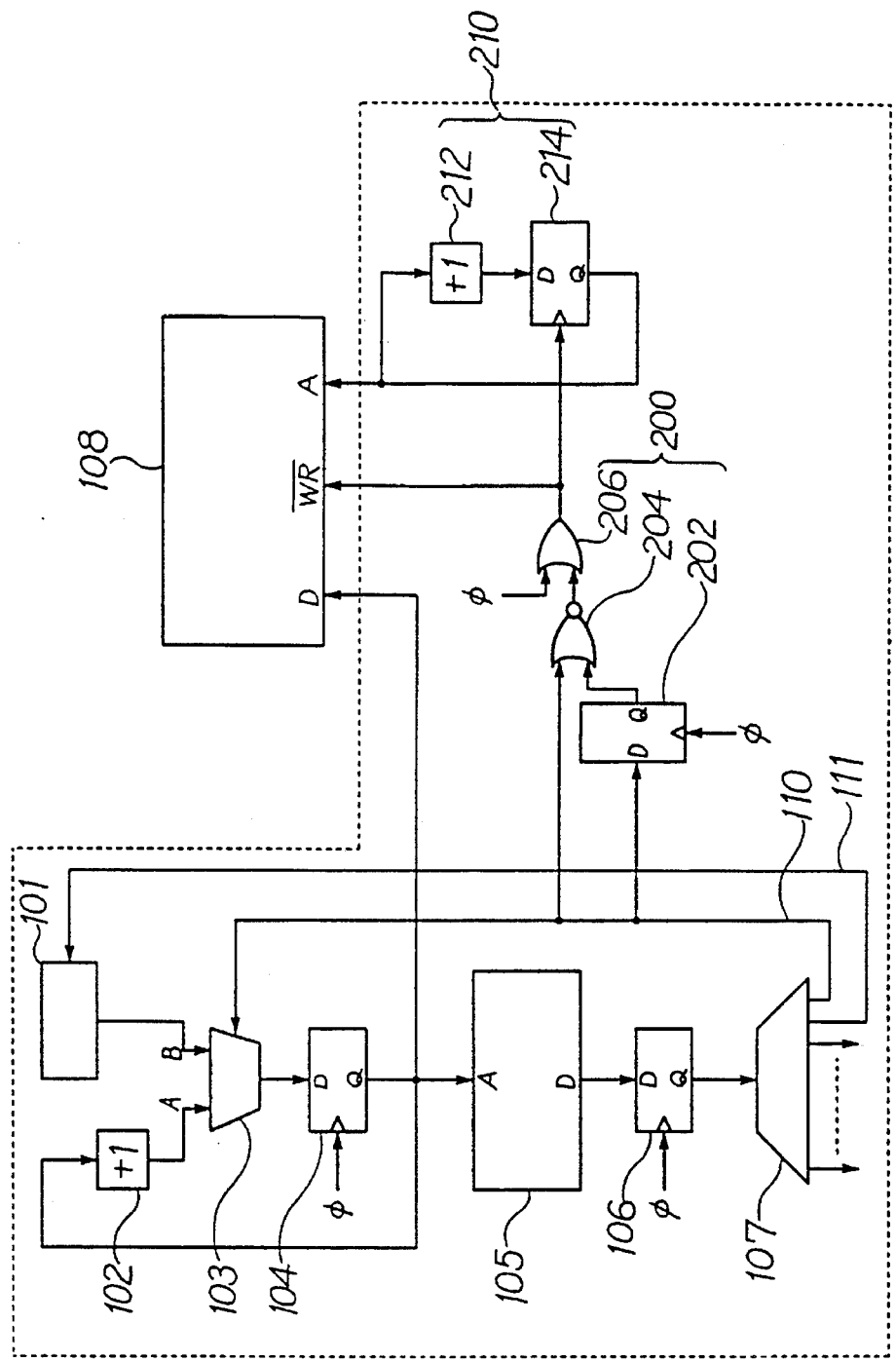
FIG. 3 is an electric circuit diagram showing another example of the partition between the portion formed of one chip and the portion formed independently.

Further, as illustrated in FIG. 3, only the address memory 108 is formed as a separately independent electric circuit. The parts other than this may take the one chip construction.

If the address selecting circuit 200 and the address generator 210 are incorporated into the chip, the connections of the electric circuits during development become more simplified than shown in FIG. 2. Therefore, the unit price of the element will not substantially increase.

Furthermore, in this embodiment, when causing the address memory 108 to store the address of the instruction data indicating the branch instruction and the branching address, only address values thereof are stored therein. The memory 108 may, however, store a discriminating symbol for discriminating the address of the instruction data from the branching address together with those address values. For example, when storing the address of the instruction data, and if it is assumed that characters or like which express [JUMP] are stored therein together with this address, the user is able to immediately recognize this data as the one indicating an address of the instruction data. Further, the user can immediately recognize data next to this data as a branching address. Still further, when storing the branching address, other discriminating symbols may be stored together. The discriminating symbols are stored together with the address data, whereby the convenience can be offered when the user effects debugging. In order to facilitate to accompany the discriminating symbols, redundancy bits may be provided in an instruction data.

(Embodiment 2)

Next, another embodiment of the present invention will be explained in conjunction with FIG. 4.

Figure 4:
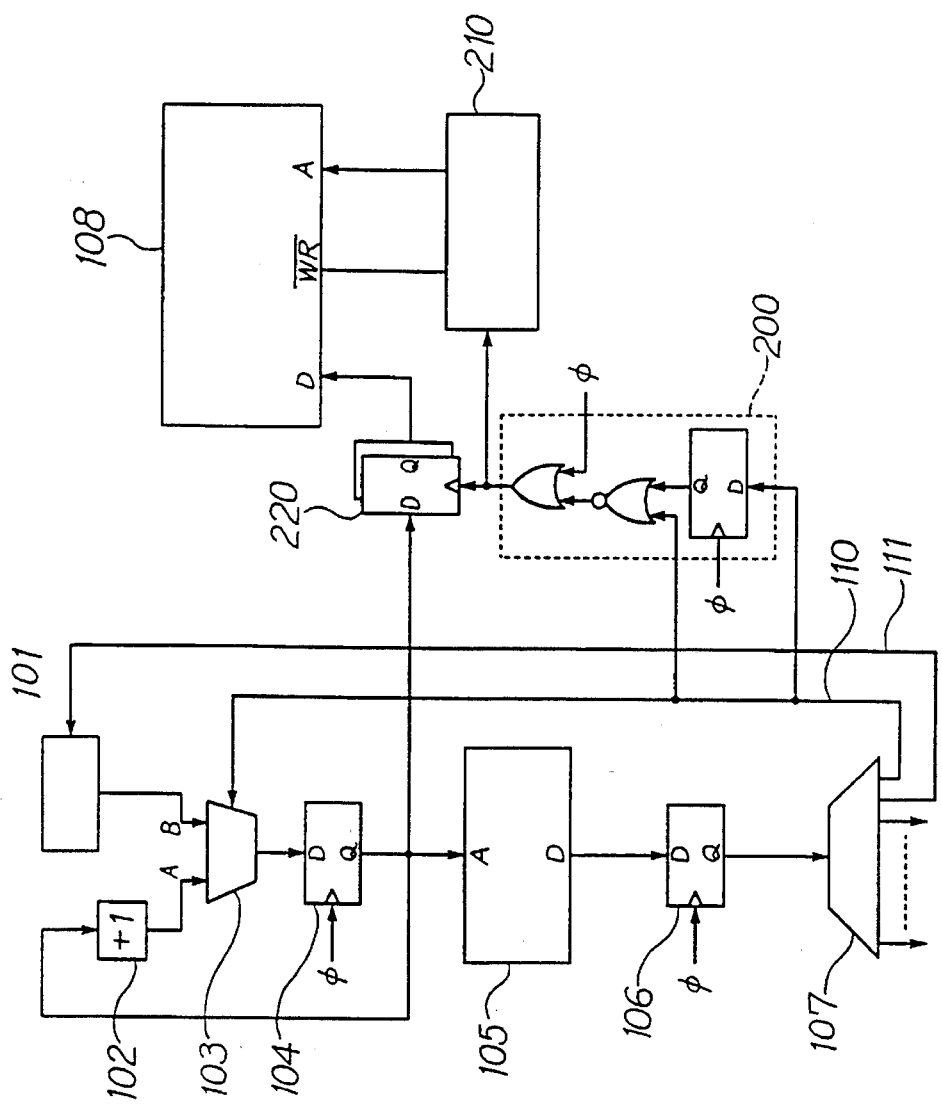
FIG. 4 is an electric circuit diagram illustrating a digital computation integrated circuit in accordance with another embodiment of the present invention.

Referring to FIG. 4, the constructive parts marked with the same numerals as those in FIG. 1 are identical with those in FIG. 1.

The digital computation integrated circuit in this embodiment is different from the preceding embodiment 1 in terms of providing a register group 220 between an output terminal of the address counter register 104 and a data input terminal of the address memory 108.

Based on this construction, the register group 220 is capable of temporarily storing the address of the instruction data indicating the branch instruction and the branching address. It is therefore feasible to employ the address memory 108 having a low access time.

The digital computation integrated circuit in this embodiment adopts the pipeline structure. It is therefore considered that the frequency to use the branch instruction is very small. The address data can be thereby temporarily stored in the register group 220 in this manner.

Incidentally, in the digital computation integrated circuit in this embodiment, as a matter of course, the address memory 108, the address selecting circuit 200, the address generator 210 and the register group 220 or some portions thereof are constructed in the form of separately independent electric circuits as in the preceding embodiment 1. Portions other than the above-mentioned may also take the one chip construction.

(Embodiment 3)

Figure 5:
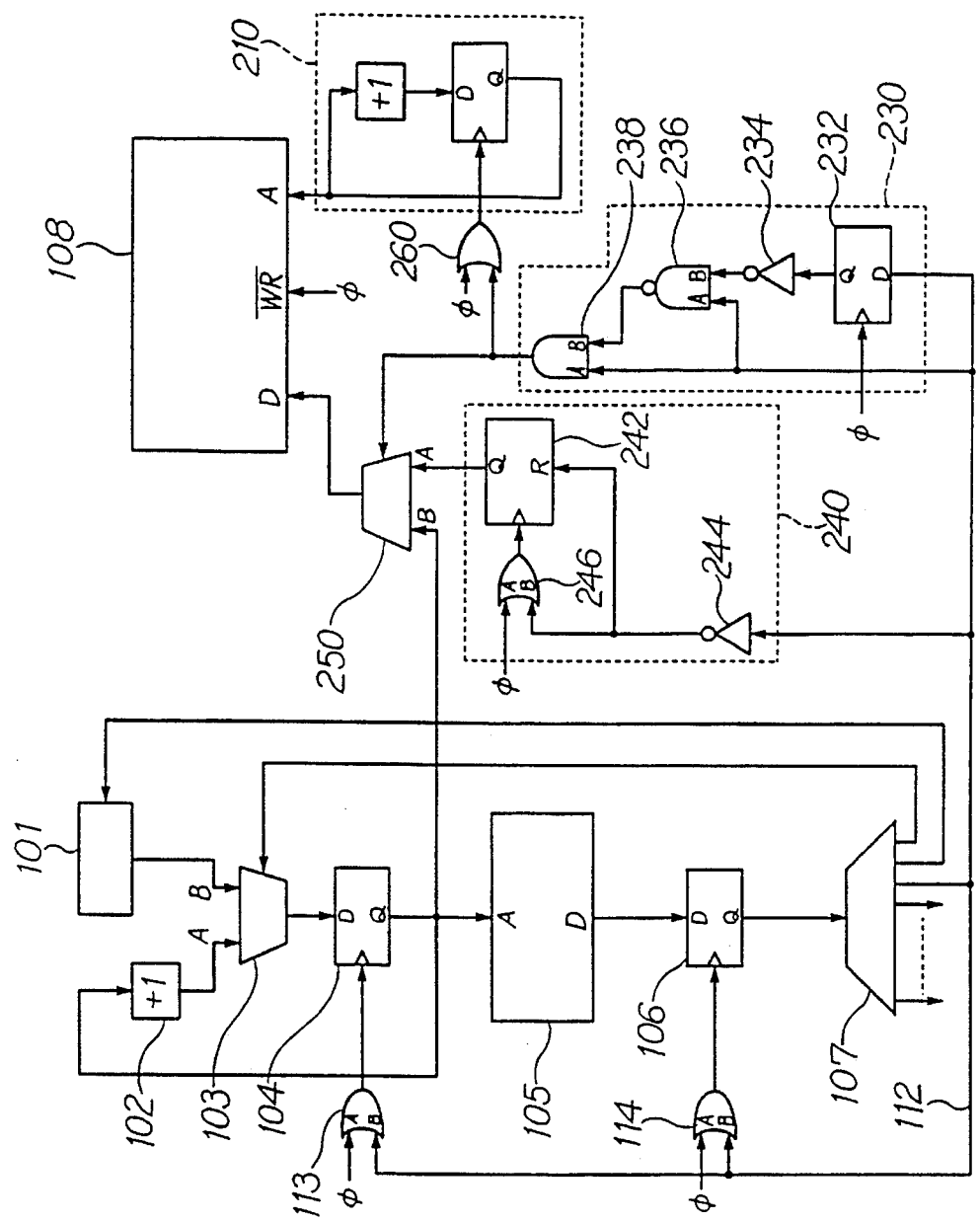
FIG. 5 is an electric circuit diagram in further embodiment of the present invention.

A further embodiment of the present invention will next be described with reference to FIG. 5. Referring to FIG. 5, the constructive parts marked with the same numerals as those in FIG. 1 are each identical with those in FIG. 1.

An address memory control circuit 230 comprises: a register 232 for repeatedly holding an instruction signal 112 in accordance with the system clock ø; a NAND circuit 236 having an input A for receiving a repetitive instruction signal 112 and an input B for receiving a signal obtained by inverting an output of the register 232 with an inventor 234; and an AND circuit 238 having an input A for receiving the repetitive instruction signal 112 and an input B for receiving an output of the NAND circuit 236.

Further, a repetitive number counting circuit 240 is composed of: an inventor 244 for inverting the repetitive instruction signal 12; an OR circuit 246 having an input A for receiving the system ø clock and an input B for receiving an output of the inventor 244; and a counter 242 using an output of this OR circuit 246 as an active clock and having a reset input R for receiving an output of the inventor 244.

Besides, as similar to this, the OR circuit 114 also outputs the same signal as the system ø clock given to its input A because of the repetitive instruction signal 112 assuming the low level. An instruction register 106 is also active in accordance with the system clock ø.

If the instruction data decoded by the instruction decoder 107 does not represent a repetitive instruction, the repetitive instruction signal 112 remains at the low level. The same action as that in the embodiment 1 discussed above is performed.

At this time, since the input A of the AND circuit 238 is at the low level, an output of the address memory control circuit 230 also assumes the low level. The storage data selector 240 for selecting input data to the address memory 108 selects the input B. The address memory 108 sequentially stores output values of the address counter register 104.

On the other hand, if the instruction data decoded represents a repetitive instruction, the instruction decoder 107 alters the repetitive instruction signal 112 to the high level. Outputs of the OR circuits 113, 114, i.e., input clocks of the address counter register 104 and the instruction register 106, are fixed at the high level. For this reason, the address counter register 104 and the instruction register 106 are not active. Hence, the instruction decoder 107 remains in such a status as to input the same instruction data from the instruction register 106. The instruction decoder 107 is thereby kept in such a status as to output the same control signal.

During a first one cycle at which the level of the repetitive instruction signal 112 changes from low to high, both of the inputs A and B of the NAND circuit 236 become the high level. The output level of this AND circuit 238 is therefore low. Further, the input B of the NAND circuit 236 assumes the high level after the next cycle, because the output level of the register 232 changes from low to high. Therefore, the output of this NAND circuit 238 becomes the high level. The output level of the AND circuit 238 is also high. More specifically, the address control circuit 230 keeps the low level during only the first one cycle after the repetitive instruction signal 112 has assumed the high level. The address control circuit 230 thereafter changes to the high level. An output of the repetitive number counting circuit 240 is thereby selected as an output of the storage data selector 250.

Further, when the repetitive instruction signal 112 becomes the high level, the reset input R of the counter 242 is cleared. At the same time, the input clock of this counter 242 varies in accordance with the system clock ø the repetitive number counting circuit 240 starts counting.

Moreover, as stated earlier, when the address control circuit 230 becomes the high level, the output of the OR circuit 260 is fixed at the high level. The action of the address generator 210 therefore halts. For this reason, the outputs of the storage data selector 250 (outputs of the repetitive number counting circuit 240) are recorded in the same address of the address memory 108 at any time.

When finishing the execution of the repetitive instruction, the repetitive instruction signal 112 assumes again the low level. The address generator 210 therefore resumes the action. The last output value of the repetitive number counting circuit 240 is stored directly in the relevant address. Besides, the storage data selector 250 selects the input B, and hence the address memory 108 sequentially stores again the output values of the address counter register 104.

As described above, according to the digital computation integrated circuit in this embodiment, the address memory 108 stores only the address of the instruction data indicating this repetitive instruction and the repetitive number on executing the repetitive instruction. It is possible to employ the address memory 108 having a much smaller storage capacity than in the conventional digital computation integrated circuit.

Note that in the digital computation integrated circuit in this embodiment also, as a matter of course, the address memory 108, the address generator 210, the address memory control circuit 230, the repetitive number counting circuit 240 and the storage data selector 250 or some portions thereof may be constructed in the form of separately independent electric circuits as in the above-mentioned embodiment 1. Portions other than the above-mentioned may also adopt the one-chip construction.

Furthermore, in accordance with this embodiment, when storing the address of the instruction data and the repetitive number as well, the address memory 108 stores only the values thereof. The address memory 108 may, however, store a discriminating symbol or like for discriminating the address of the instruction data from the repetitive number together with such values. For instance, if characters [LOOP] are stored therein together with the address of the instruction data showing the repetitive instruction, the user is capable of immediately recognizing that this data is an address of the instruction data indicating the repetitive instruction, and the next data represents a repetitive number. Further, the repetitive number may be stored together with other discriminating symbols. The discriminating symbols are stored together with the data on the address and the repetitive number in this way, whereby the convenience can be offered when the user performs debugging. In order to facilitate to accompany the discriminating symbols, redundancy bits may be provided in an instruction data.

As fully discussed above, according to the present invention, it is possible to provide the digital computation integrated circuit capable of employing the address memory having the very small capacity even if the number of steps of the instruction program is large.

Hence, according to the present invention the digital computation integrated circuit can be provided at a low price.

Although the illustrative embodiments of the present invention have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. A digital computation integrated circuit comprising:

first address generating means for generating a first address signal indicating a first address that sequentially follows a preceding address;

second address generating means, in response to a control signal, for generating a second address signal indicating a second address that does not sequentially follow the preceding address;

address selecting means for selecting the first address signal in response to a first selection signal, and for selecting the second address signal in response to a second selection signal;

instruction memory means for storing instruction data;

store address designating means, in response to the selected one of the first and second address signals, for designating a storing address of the instruction data in the instruction memory means, the instruction memory means outputting the instruction data as a result thereof;

instruction decode means for receiving the instruction data outputted from said instruction memory means, for converting the instruction data into the control signal to be outputted when the instruction data represents non-sequential progress of a program and for outputting either the first selection signal indicating that the instruction data represents sequential progress of the program or the second selection signal indicating that the instruction data represents the non-sequential progress of the program;

third address generating means, in response to the second selection signal, for generating a third address signal related to the non-sequential progress of the program; and address memory means for storing the generated second and third addresses.

2. The digital computation integrated circuit according to claim 1, wherein said non-sequential progress of the program is by a branch instruction.

3. The digital computation integrated circuit according to claim 1, wherein said non-sequential progress of the program is by a repetition instruction.

4. The digital computation integrated circuit according to claim 1 further comprising means, in response to the second selection signal, for generating discriminating information to discriminate a storing address of the instruction data from an address which is a destination of non-sequential progress of the program stored in the address memory means.

5. The digital computation integrated circuit according to claim 4, wherein said discriminating information is expressed by a redundancy bit of the instruction data.

6. The digital computation integrated circuit according to claim 1, wherein said instruction memory means, store address designating means and instruction decode means are integrated as a semiconductor device.

7. The digital computation integrated circuit according to claim 1, wherein said instruction memory means, store address designating means, instruction decode means, and third address generating means are integrated as a semiconductor device.

8. The digital computation integrated circuit according to claim 1, wherein the generated second address signal is input to a data port of said address memory means and the generated third address signal is input to an address port of said address memory means, whereby said generated second address signal is stored in said address memory means at a location corresponding to the generated third address signal.

9. The digital computation integrated circuit according to claim 8, wherein said address selecting means comprises:

a latch configured to receive the second selection signal and a clock signal and to output a synchronous second selection signal as a result thereof;

a NOR gate connected to said latch and configured to receive the synchronous second selection signal from said latch and the second selection signal, said NOR gate outputting a second control signal as a result thereof; and an OR gate connected to said NOR gate and configured to receive said clock signal and said second control signal, said OR gate outputting a third control signal to said third address generating means as a result thereof.

10. The digital computation integrated circuit according to claim 9, wherein said third address generating means comprises:

an incrementer having an input port connected to said address memory means and configured to output a value that is one greater than a value received on the input port of said incrementer;

a latch configured to receive the third control signal from said OR gate at a clock input and to receive the output of the incrementer at a data input, and to output a clocked output to the address port of the address memory means, said clocked output also being received at the input port of said incrementer.

11. A digital computation integrated circuit comprising:

first address generating means for generating a first address signal indicating a first address that sequentially follows a preceding address;

second address generating means, in response to a control signal, for generating a second address signal indicating a second address that does not sequentially follow the preceding address;

address selecting means for selecting the first address signal in response to a first selection signal, and for selecting the second address signal in response to a second selection signal;

instruction memory means for storing instruction data;

store address designating means, in response to the selected one of the first and second address signals, for designating a storing address of the instruction data in the instruction memory means, the instruction memory means outputting the instruction data as a result thereof;

instruction decode means for receiving the instruction data outputted from said instruction memory means, for converting the instruction data into the control signal to be outputted when the instruction data represents a branch instruction and for outputting either the first selection signal indicating that the instruction data represents sequential progress of a program or the second selection signal indicating that the instruction data representing the branch instruction;

address accepting means, in response to the second selection signal, for accepting a store address and a jump destination address included in the instruction data representing the branch instruction;

store address generating means for increasing the store address when said address accepting means has received the store address and the jump destination address; and address memory means for storing the store address and the jump destination address accepted by the address accepting means in the address increased and outputted by the store address generating means.

12. The digital computation integrated circuit according to claim 11, further comprising means, in response to the second selection signal, for causing said address memory means to store discriminating information for discriminating the address of the instruction data from the jump destination address.

13. A digital computation integrated circuit comprising:

first address generating means for generating a first address signal indicating a first address that sequentially follows a preceding address;

second address generating means, in response to a control signal, for generating a second address signal indicating a second address that does not sequentially follow the preceding address;

address selecting means, for selecting the first address signal in response to a first selection signal, and for selecting the second address signal in response to a second selection signal;

instruction memory means for storing instruction data;

store address designating means, in response to the selected one of the first and second address signal, for designating a storing address of the instruction data in the instruction memory means, the instruction memory means outputting the instruction data as result thereof;

instruction decode means for receiving the instruction data outputted from said instruction memory means, for converting the instruction data into the control signal to be outputted and outputting a repetition signal when the instruction data represents a repetition instruction and for outputting either the first selection signal indicating that the instruction data represents sequential progress of a program or the second selection signal indicating that the instruction data represents the repetition instruction;

count means, in response to the repetition signal, for counting a number of repetition by the repetition instruction;

store address generating means, in response to the repetition signal, for generating an address where the number of repetition is stored; and address memory means for storing said address of said repetition instruction data and the number of repetition of the count means.

14. The digital computation integrated circuit according to claim 13 further comprising means, in response to the second selection signal, for generating discriminating information to discriminate a storing address of the instruction data from the number of repetition of the count means.

* * * * *